United States Patent [19]

Gantz et al.

[11] 4,231,634

[45] Nov. 4, 1980

[54] OPTICAL IMAGE MULTIPLYING DEVICE

[76] Inventors: Jeanne A. Gantz, 1972 El Dorado, Berkeley, Calif. 94707; David W. Kelso, 3929 Everett Dr., Oakland, Calif. 94602

[21] Appl. No.: 39,097

[22] Filed: May 14, 1979

Related U.S. Application Data

[63] Continuation-in-part of Ser. No. 838,150, Sep. 30, 1977, Pat. No. 4,162,117.

[51] Int. Cl.³ ............................................. G02B 23/00
[52] U.S. Cl. ......................................... 350/4.2; 353/2
[58] Field of Search ....................... 350/4.1, 4.2; 353/2

[56] References Cited

U.S. PATENT DOCUMENTS

| | | | |
|---|---|---|---|
| 2,152,424 | 3/1939 | Wetmore | 350/4.2 |
| 2,762,257 | 9/1956 | Vacher | 350/4.2 X |
| 2,991,689 | 7/1961 | Taylor | 350/4.2 |
| 3,014,302 | 12/1961 | Hughes | 350/4.1 X |
| 3,039,356 | 6/1962 | Knittel | 350/4.2 |
| 3,099,933 | 8/1963 | Weiner | 350/4.1 |
| 3,122,859 | 3/1964 | Reaux, Jr. | 350/4.1 X |
| 3,160,975 | 12/1964 | Malina | 350/4.1 X |
| 3,343,453 | 9/1967 | Butterfield | 350/4.1 X |
| 3,884,547 | 5/1975 | Parrino | 350/4.2 |

Primary Examiner—Richard A. Wintercorn
Attorney, Agent, or Firm—Townsend and Townsend

[57] ABSTRACT

An optical image multiplying device includes an object cell containing a plurality of tumbler objects, each of which carries a pictorial image on a selected region thereof. The pictorial region of each object includes transparent portions which permit the viewer to see detail of the objects behind it. The pictorial regions are surrounded by transparent regions that permit the individual images or distinctive parts thereof to become periodically quite recognizable as the objects tumble relative to one another. Additionally, placement of the pictorial regions on geometrically different parts of their respective tumble objects enhances periodic recognizability. A selected region immediately adjacent, and possibily surrounding the pictorial region is provided with transparent color, but a portion of at least one tumbler object is preferably clear. A number of generally transparent beads, typically clear or of primary colors in a subdued tone may be included in the object cell. While these beads do not permit the viewer to discern details of objects behind them, their outlines can be seen and the beads pick up color of the objects through which they are viewed. Thus, the beads may at different times appear as different colors and the viewer is sometimes able to detect a change of color as the bead moves across the boundary between regions of different color.

11 Claims, 20 Drawing Figures

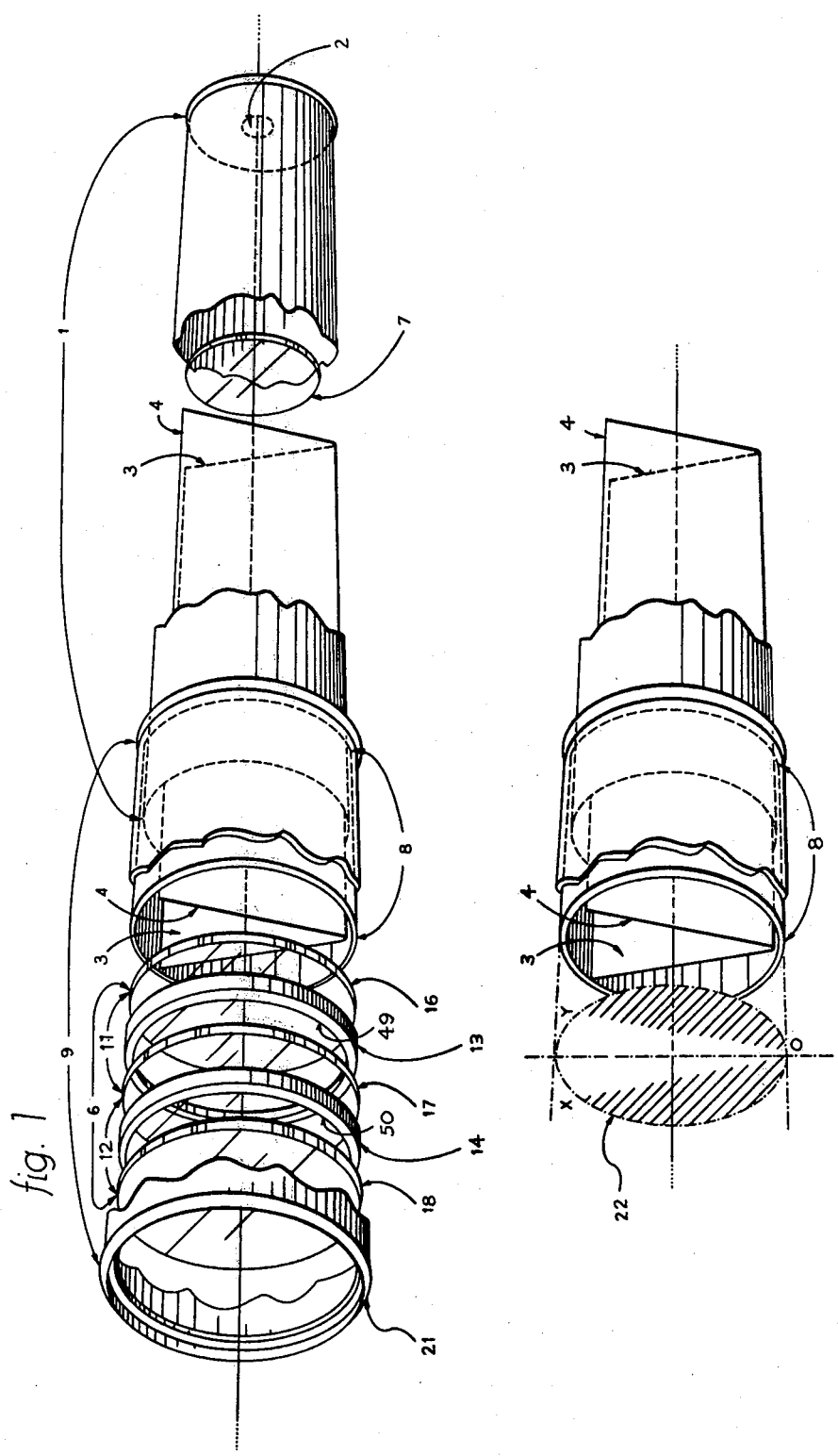

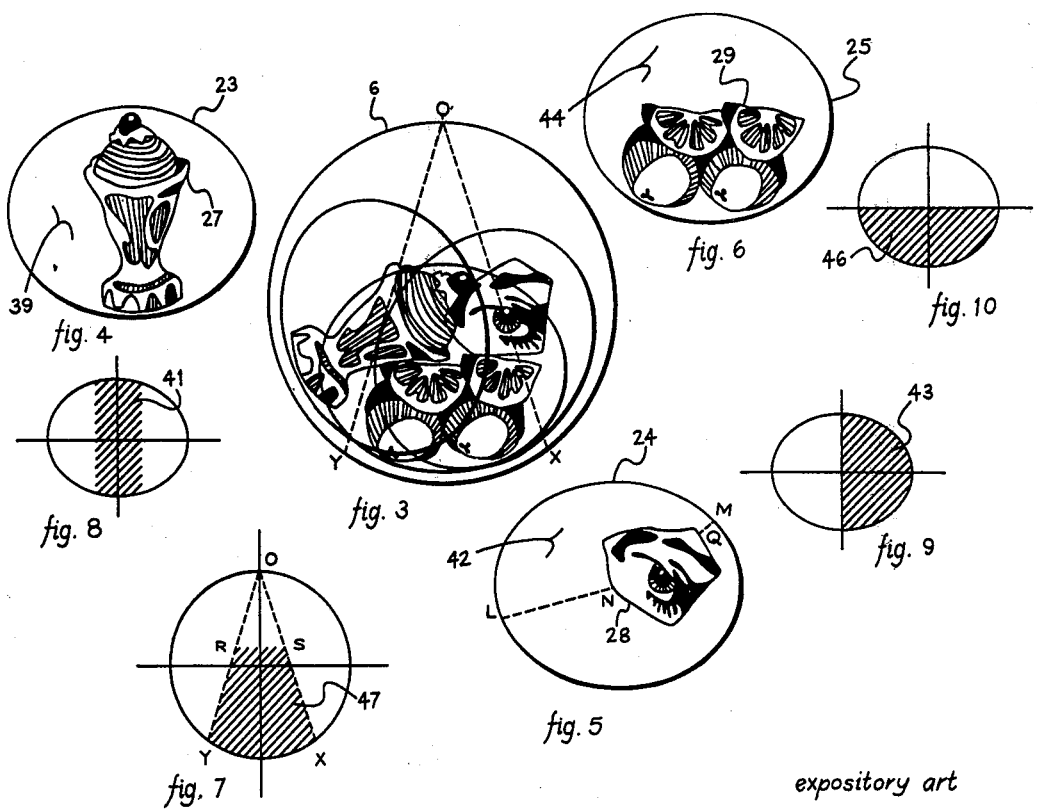
expository art
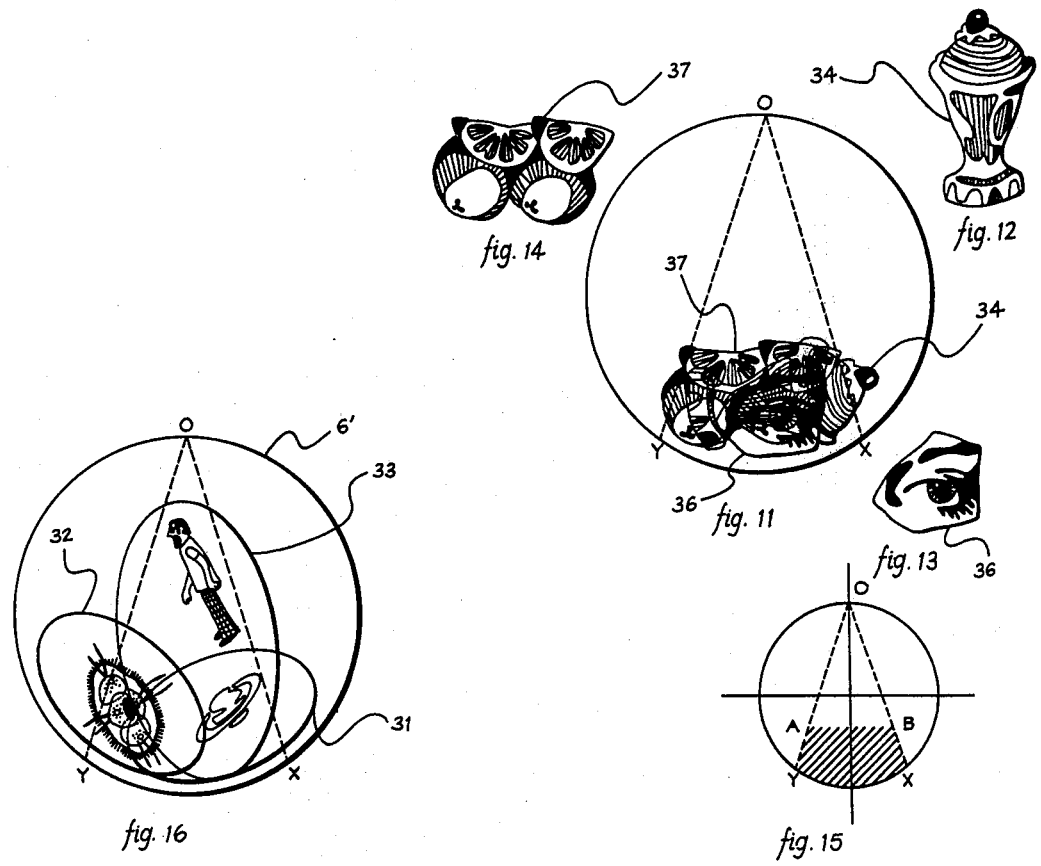

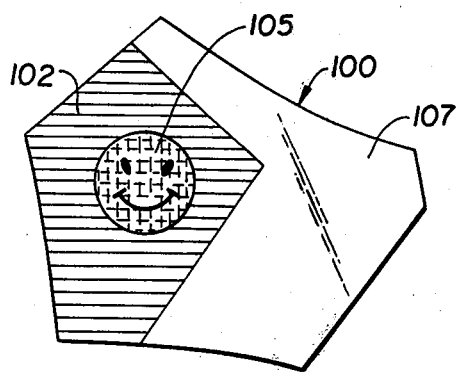
FIG._17.
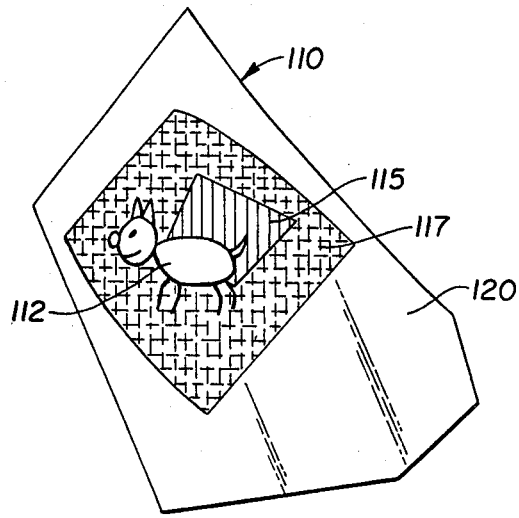
FIG._18.
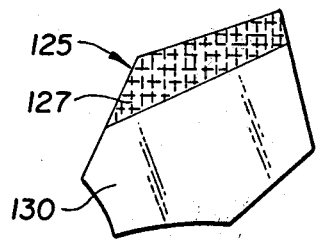
FIG._19.
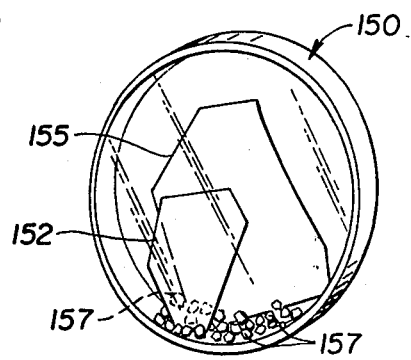
FIG._20.

OPTICAL IMAGE MULTIPLYING DEVICE

FIELD OF THE INVENTION AND RELATED APPLICATIONS

This invention relates to optical devices for image multiplicaton. This application is a continuation-in-part of U.S. patent application Ser. No. 838,150 filed Sept. 30, 1977, now U.S. Pat. No. 4,162,117 issued July 24, 1979.

BACKGROUND OF THE INVENTION

Pictorial image multiplication has intrigued man since the invention of the mirror. The barber shop and the clothing store are but two examples of places where a viewer situated between plane mirrors could see multiple images of himself. However while optical image multiplication is known, pictorial image multiplication within an optical device has proven as illusive to inventors as the illusion they hoped to create.

What are apparently the first writings on the subject occur in Magia Naturalis, Book VII, Chapter 2, where Baptista Porta described the effect of two plane mirrors as a machine for multiplying images. An explanation of this phenomenon was explained as early as 1646 by Kircher in Ars Magna Lucis Et Umbrae, Page 89, where the relation between the number of images and the inclination of the two mirrors was developed. Propositions in Harris' Optics and Woods' Optics relate to the multiplication in circular arrangement of the sectors formed by the inclined mirrors and to the progress of a ray of light reflected between two inclined or parallel mirrors.

Sir David Brewster combined these teachings with his own research on light polarization by successive reflection between plates of glass, and developed an optical instrument which he named the kaleidoscope. Brewster's kaleidoscope was capable of receiving colors and abstract outlines, shapes, and patterns into the direct viewing sector and multiplying them symmetrically. Additionally, he was able to optically reduce and focus images from the immediate environment onto the direct viewing sector. These discoveries and refinements were published in 1819 in Brewster's treatise on the kaleidoscope.

In the years since its invention the kaleidoscope has remained a popular amusement device for children and adults alike. A typical kaleidoscope comprises a generally tubular body having an ocular aperture at one end, an object cell at the other end, and a plurality of plane mirrors within the body. The object cell contains a plurality of colored glass chips that may freely tumble so as to assume a substantially infinite number of possible configurations within the direct viewing sector. The kaleidoscope mirrors produce a symmetrical multiplication of the images of the glass chips. The instantaneous patterns that are viewed in the kaleidoscope are themselves often spectacular, but the overall appeal of the device is enhanced by the dynamic effects that are produced as the glass chips tumble from one position to another.

While the number of possible patterns is in principle infinite, there are only a few distinctive classes of chip configurations. Attempts to increase the variety of the kaleidoscopic display have manifested themselves in variations of the basic device wherein more complex tumbling objects are placed within the object cells. For example, it is known to provide partially filled liquid-containing capsules as tumbler objects, to include small familiar objects along with glass chips, and to provide a silhouette of a familiar form. However, efforts to date have not resulted in a material increase in the variability (either qualitative or quantitative) of the patterns available.

SUMMARY OF THE INVENTION

The present invention is an optical image multiplication device that successfully integrates the dynamic aspects of the standard kaleidoscope with the subtle variations of pictorial image multiplication.

A device according to the present invention differs from prior art devices in the configuration of tumbler objects within the object cell. The object cell contains a plurality of tumbler objects, each of which carries a pictorial image on a selected region thereof (hereinafter sometimes referred to as the "pictorial region"). The pictorial region of each object includes transparent portions which permit the viewer to see detail of the object behind it. In the context of this patent application the term "transparent" will refer to both colored and uncolored objects, so long as at least some colors of light can pass therethrough substantially without scattering. When it is desired to refer to an uncolored transparent object, the term "clear" will be used. Similarly, the term "translucent" will refer to transparent and diffuse objects that transmit light. Depending on whether the pictorial image is graphic or photographic in nature, and on the process used to print the tumbler objects, recognizable aspects may be provided by generally opaque outlines having transparent areas in between, or by contrasting colored regions. The colors may be provided by a half-tone process which supplies internal detail by providing variable clear areas between translucent dots of color, or by transparent dyes. These tumbler objects, preferably in the form of thin transparencies, are shaped to tumble relative to one another so that the pictorial portions overlap each other in a continually changing translational and rotational relationship. The overlap produces abstract patterns of considerable variety and complexity.

Aside from the virtually limitless variations possible by overlapping of the pictorial images, a further degree of fascination is achieved by providing that the individual images, or distinctive parts thereof, will periodically become quite recognizable as the objects assume varying positions relative to one another. This is achieved by providing transparent fields on which the pictorial images are carried. Thus, at certain times, a transparent region of a first tumbler object will overlap the pictorial region of a second tumbler object so that the second tumbler object pictorial image is recognizable. The recognizability of such images or parts thereof may be enhanced by providing that one or more of the images is particularly simple, or that the images are of differing size and/or color.

Periodic recognizability of the individual pictorial images is aided by careful placement of the images on different parts of their respective transparent fields. Since the periphery of the tumbler object contacts the inner circumference of the object cell, controlling the placement of the pictorial images on the tumbler objects provides for controlled spacing. By having tumbler objects of different sizes, and by providing different distances from the tumbler object periphery to the pictorial regions, periodic separation is enhanced.

According to a further aspect of the present invention, a selected region immediately adjacent, and possibly surrounding, the pictorial region is provided with transparent color. However, a portion of at least one tumbler object, typically extending to an edge, is preferably left clear (colorless). The pictorial region itself may be defined by a pattern of opaque outlines defining transparent regions bounded thereby. These transparent regions may be colored, but this is not necessary. The transparent colored regions defining the pictorial image or the selected region adjacent the pictorial region preferably carry primary colors (e.g. red, blue, and yellow), sometimes at more than one density, so that as different colored regions of the different tumbler objects overlap, new colors are formed. However, it should be understood that a certain amount of color subtraction producing a substantial opaque region is not necessarily undesirable. In fact, where three or more tumbler objects are used, and each carries a different primary color on a given portion, an overlap of the three primary colored portions will produce an opaque region. Similarly, where a non-primary color is used on a portion of a tumbler object in order to increase the range of possible hues available, substantial color subtraction with two tumbler objects will occur at certain overlap positions.

While there is no set number of tumbler objects required to practice the present invention, it has been found that two or three tumbler objects, each having a pictorial region, provide a surprising degree of pattern complexity and variability while permitting individual images to be recognized with sufficient frequency to maintain viewer interest. Where the device contains only two tumbler objects having pictorial regions, additional complexity and variation of the overall pattern may be achieved while avoiding undue incoherence by the provision of a third tumbler object that is generally devoid of pictorial content but has a transparent colored region on a clear background. The present invention produces a surprising degree of dynamism, since in addition to the changing patterns resulting from the interaction of the pictorial regions, the overlapping colored regions change apparent color as the tumbler objects assume new positions relative to one another.

The dynamic effect may be even further enhanced by the inclusion in the object call of a number of generally transparent beads. At least some of these beads are preferably clear, but some colored beads, especially of primary color in a subdued tone, may be included. As in the prior art devices, refraction by the beads prevents the viewer from discerning details of objects behind them. However, this refraction also produces a focusing effect which provides relatively intense, localized highlights. The beads are located behind at least one of the tumbler objects with respect to the viewer who can see the bead outlines as well as the focused spots of light through the tumbler objects. Thus rather than appearing clear or of one or two colors, the beads pick up the color of the object through which they are viewed. In this way, the beads may at different times appear as all different colors, and the viewer may be able to detect a change of color as a bead moves across a boundary between regions of different color. Thus, the dynamic effect from the tumbling objects, enhanced by the falling beads, is even further enhanced by the color changes that some of the beads undergo during the time they are moving from one position to another. The beads thus cooperate with the tumbler object to provide a measure of distraction and additional complexity while still permitting the pictorial information to be seen.

According to yet a further aspect of the present invention, the object cell itself is divided into a plurality of spaced compartments, each of which contains a separate tumbler object. This separation of the tumbler object permits each tumbler object to tumble independently and without frictional interference from the others. This provides a greater degree of dynamism as the tumbler objects may more easily fall from one position to another. Moreover, the effect is further enhanced by the resultant ability of each tumbler object to bounce a little bit before coming to rest.

The separation of the tumbler objects along the viewing path also makes possible the selective emphasis of one or more of the objects. This is accomplished by illuminating the object nearest the viewer to some extent by unmodified light that has not been subjected to color subtraction. This is accomplished by making the inner walls of the object cell compartment white to scatter unmodified light which provides some of the illumination of the tumbler object nearest the viewer. The spatial separation of the tumbler object has an additional result when the color bearing portions of the tumbler objects are in the form of half tones, since the ability of the light passing through the clear regions between the dots of color on one tumbler object to illuminate the other is enhanced.

For a further understanding of the nature and advantages of the present invention, reference should be had to the remaining portions of this specification and to the attached drawings.

BRIEF DESCRIPTION OF THE DRAWINGS

FIG. 1 is an exploded, partially cut away perspective view of the device of the present invention;

FIG. 2 is a fragmentary perspective view of the device of FIG. 1 with a schematic representation of the direct viewing area;

FIG. 3 is an end view of the object cell of the device of FIGS. 1 and 2 showing one position that may be assumed by three tumbler objects within the cell.

FIGS. 4–6 are plan views of respective pictorial objects that form the composite pattern shown in FIG. 3;

FIG. 7 is a schematic representation of the portion of the direct viewing area taken up by the pictorial regions of the objects illustrated in FIGS. 4–6;

FIGS. 8–10 are schematic representations of the tumbler objects of FIGS. 4–6, respectively, showing the general placement of the pictorial regions thereon;

FIG. 11 is an end view of the object cell of the device of FIGS. 1 and 2 showing the generally incoherent pattern formed when the pictorial regions cover substantially the entire area of the tumbler objects;

FIGS. 12–14 are plan views of the tumbler objects devoid of transparent surrounding fields that form the composite pattern shown in FIG. 11;

FIG. 15 is a schematic representation of the portion of the direct viewing area taken up by the pictorial regions of the objects illustrated in FIGS. 11–14;

FIG. 16 is an end view of the object cell of the device of FIGS. 1–2 showing a position of image separation which three different pictorial objects may take within the cell;

FIGS. 17 and 18 are plan views of tumbler objects having graphic information and colored areas devoid of pictorial information abutting the pictorial regions;

FIG. 19 shows a tumbler object devoid of pictorial information but having a transparent colored region thereon; and FIG. 20 is a perspective view of an object cell containing two tumbler objects and a plurality of transparent beads.

DESCRIPTION OF THE PREFERRED EMBODIMENTS

FIG. 1 is an exploded, partially cut away perspective view of an image multiplying device according to the present invention. Broadly, the device of the present invention is constructed in a manner similar to a standard kaleidoscope, and comprises a generally tubular housing 1 having an ocular aperture 2 in one end, V-shaped reflecting planes (mirrors) 3 and 4 contained in housing 1, and an object cell 6 mounted on the other end of housing 1. An ocular glass 7 may be placed adjacent ocular aperture 2. The angle of inclination of mirrors 3 and 4 is largely a matter of design choice, being preferably an integral submultiple of 360 degrees. An angle of 36 degrees gives good image multiplication. Mirrors 3 and 4 should be of high reflectivity and flatness since it is pictorial images that are to be multiplied. First surface mirrors are preferred. A collar 8 is fitted outside housing 1 at the object cell end.

Object cell 6 is mounted to a cylindrical sleeve 9 that overlies collar 8 for rotation thereabout. Sleeve 9 may carry an annular flange at its end nearest ocular aperture 2 for engaging collar 8 to prevent sleeve 9 from separating from housing 1. Object cell 6 may include one or more compartments. For example, the embodiment of FIG. 1 includes two separate compartments 11 and 12. Object cell 6 includes housing rings 13 and 14 and translucent members 16, 17, and 18. Members 16 and 17 should be clear while member 18, placed adjacent objective end 21, may be diffuse. Housing rings 13 and 14 have inner surfaces 49 and 50, respectively, which may be white. With reference to FIG. 2, broken line 22 represents a projection of object cell 6 on an imaginary plane. The direct viewing sector through ocular aperture 2 on the imaginary plane is represented by the clear area bounded by line segments OX and OY.

Object cell 6 contains a plurality of tumbler objects which rotate and tumble relative to one another as object cell 6 is rotated. FIG. 3 is an end view of object cell 6 showing one position that may be assumed by three tumbler objects 23, 24 and 25, also illustrated individually in FIGS. 4, 5 and 6, respectively. With reference to FIGS. 4–6, it can be seen that tumbler objects 23, 24, and 25 have respective pictorial regions 27, 28, and 29, respectively. Tumbler objects 23, 24, and 25 are preferably fabricated from transparent, semirigid sheet material such as acetate. The particular choice of pictorial subject matter is bounded only by human imagination. With the advent of general photographic processes (e.g. photoreduction and enlargement, microscopic and telescopic photography) and color transparencies, the possibilities of photographic images are endless. For example, FIG. 16 shows tumbler objects 31, 32, and 33 having a telescopically enlarged photographic image of the planet Saturn, a microscopically enlarged image of a single cell animal, and a reduced image of a human figure, respectively.

Each tumbler object carries a pictorial image on a selected region thereof, sometimes referred to as the "pictorial region". The pictorial region includes transparent portions which permit the viewer to see detail of a tumbler object in direct line behind it. In this context, the term "transparent" will refer to colored and uncolored objects, so long as some colors of light can pass therethrough substantially without scattering. When it is desired to refer to an uncolored transparent object, the term "clear" will be used. Similarly, the term "translucent" will refer to transparent and diffuse objects, so long as light is transmitted.

Depending on whether the pictorial image is graphic or photographic in nature, and depending on the process used to place the pictorial information on the tumbler object, recognizable aspects may be provided by generally opaque outlines with transparent areas in between, or by contrasting colored regions. The colors themselves may be provided by transparent dyes in a silkscreen process or by a half tone process such as photo litho offset which provides clear areas between translucent dots of color. Where the dots of color are of variable size or spacing, the half tone process can provide internal detail. Color xerography may also be used to provide the pictorial regions.

With the pictorial content of each of the tumbler objects being transparent in nature, the pictorial images are seen through and are modified by interference from the other pictorial images in line with them within the direct viewing sector. As the tumbler objects rotate relative to one another, the pictorial regions tend to overlap, thus providing abstract and often complex patterns. FIG. 3 shows one of the infinite variety of positions tumbler objects 23–25 are capable of assuming. It is to be noted that those portions of the pictorial information visible within the direct viewing sector are only slightly overlapping in the position shown. Since it is an important aspect of the invention to provide periodic visual recognition of one or more of the individual pictorial images, each tumbler object has a transparent area substantially devoid of pictorial content. Thus, referring again to FIGS. 4–6, tumbler objects 23, 24, and 25 have respective transparent regions 39, 42, and 44 distinct and apart from the respective pictorial regions.

Additionally, even when the tumbler objects are the same shape, the different pictorial regions are preferably placed on geometrically different portions of the object. In particular, referring also to FIGS. 8–10, pictorial region 27 of tumbler object 23 is placed centrally on tumbler object 23 as denoted by shaded area 41 in FIG. 8. Similarly, pictorial region 28 of tumbler object 24 is placed off center displaced generally along the long dimension as denoted schematically by shaded region 43 in FIG. 9, while pictorial region 29 of tumbler object 25 is placed off center displaced generally along the short dimension as denoted by shaded area 46 in FIG. 10. While tumbler objects 23–25 are shown as elliptical, they could have other shapes, as will be described below. Thus, in their various positions, pictorial regions 27, 28 and 29, in the aggregate, have the capability of covering a relatively large portion of the direct viewing center. This is denoted schematically in FIG. 7 which shows a shaded area RSXY representing the possible area occupied by the pictorial regions.

The placement of the pictorial regions on geometrically different portions of the tumbler objects effects the proper periodic separation since it is the periphery of the tumbler object and not the pictorial region that contacts the inner circumference of the object cell. This spaces the pictorial region away from the circumference so that when the object cell is rotated, the images are fixed within the clear field whose periphery rotates along the circumference of the object cell. For example, if tumbler object 24 rests upon the circumference of the object cell at a point L on the field periphery, the pictorial region will be at a greater distance from te circumference of the object cell than if object 24 rested at a point M. These variations in distance cause each image to shift continually in its spatial relationship to other images in the object cell as well as to the circumference of the object cell. The shifting spatial relationships among the images increase the frequency at which the individual images are sufficiently spatially separated from one another to be recognizable.

The importance of transparent regions 27, 28, and 29 is best seen with reference to FIGS. 11–15 which show the consequences of a failure to provide such regions. In particular, each of tumbler objects 34, 36, and 37, illustrated individually in FIGS. 12, 13 and 14, respectively, comprises a pictorial region only. Thus, as shown in FIG. 11, when these objects are in the direct viewing sector, a dark, non-recognizable mass is typically viewed. These objects are capable of occupying the shaded area ABXY illustrated in FIG. 15. It is readily apparent that this area is significantly smaller than area RSXY of FIG. 7.

The above description was primarily concerned with the placement of the pictorial region on the tumbler objects. FIGS. 17 and 18 illustrate a further aspect of the invention wherein color may be used to increase the complexity of the overall effect without materially reducing the periodic recognizability of individual pictorial images. Broadly, a selected region distinct from and preferably adjacent the pictorial region is provided with transparent color. FIGS. 17 and 18 illustrate schematically the provision of transparent colored areas in a surrounding relationship to the pictorial region. While the examples illustrated are for tumbler objects wherein the pictorial region is defined by opaque outlines (i.e. is graphic in nature), this feature could be applied to tumbler objects having pictorial regions that are photographic in origin.

FIG. 17 shows a tumbler object 100 having a pictorial region 102 defined by and bounded by opaque lines designating a stylized face. Pictorial region 102 on its transparent portions is provided with a first color, here shown shaded for yellow. A region of tumbler object 100 surrounding pictorial region 102 and adjacent thereto is provided with a second color, here shown shaded for blue. Tumbler object 100 has a third clear region 107 covering its remaining area. FIG. 18 shows a tumbler object 110 having a pictorial region 112 bounded and defined by opaque lines designating a stylized fourlegged animal. As a variation, the transparent portions of pictorial region 112 are clear (i.e. devoid of color). A region 115 adjacent pictorial region 112 but not surrounding it is provided with transparent color, here shown shaded for red. A second transparent colored region 117 surrounds pictorial region 112 and first colored abutting region 115 and is provided with a different color, here shown shaded for yellow. The remaining region 120 of tumbler object 110 is clear.

It should be noted that the respective peripheries of tumbler objects 100 and 110 are irregular in shape, although generally defining polygons having differing angles. Thus, as the tumbler objects are rotated, they remain relatively stationary with respect to the object cell for a time, and then suddenly change position, rotating relative to the object cell in a relatively abrupt manner, rotating about the point of contact defined by one of the points of the polygon.

While the colors of the regions on tumbler objects 100 and 110 are exemplary, the particular colors shown are primary colors and are disposed such that every possible combination of two primary colors may occur as an overlap. Therefore, in a device with just two tumbler objects as described above, the pattern that will be produced contains, at various times, all the basic colors. As the different colored portions on respective tumbler objects move relative to one another, different colors are produced. Thus, in addition to the intermittent separation and hence recognizability of the pictorial regions, the changing patterns resulting from the overlapping colored regions produces an additional degree of dynamism and fascination.

As discussed in connection with FIGS. 11–14, the possibility for undeu complexity and hence loss of recognizability of individual pictorial features should be avoided. Accordingly, when it is desired to provide color effects due to overlapping primary colors, it is found that sufficient pictorial complexity and variability is provided by two tumbler objects, as far example, similar to those shown in FIGS. 17 and 18. However, the range of color effects may be advantageously extended by the provision of a third tumbler object 125 as shown in FIG. 19. Tumbler object 125 is substantially devoid of pictorial content, but includes a transparent colored region 127, shown shaded for yellow, with the remaining portion 130 of the tumbler object being clear.

Although it might appear that when portions of the three tumbler objects carrying different primary colors overlap, that there would be objectionable color subtraction to the point of generating totally opaque areas, this is generally not the case. For one thing, the depth of color on the tumbler object need not be so great as to result in total subtraction. In any event, a certain amount of relatively total color subtraction, so long as it is confined to relatively small portions of the viewing area, is not necessarily objectionalbe, and may in fact enhance the effect.

Additionally, total color subtraction will occur only when the three tumbler objects arein direct contact. As soon as the tumbler objects are spaced apart, by mechanisms to be described below, a certain amount of unmodified light that has not been subjected to color subtraction reaches the tumbler objects nearest the viewer. Also, in those cases where the color is supplied by a half tone process, the clear areas between the color dots allow for partial illumination, even when the tumbler objects are directly overlapping and in substantial contact.

Returning to FIG. 1, freer tumbling of the tumbler objects is achieved by the multiple compartment structure of object cell 6. In particular, each object cell may carry its own respective tumbler object so that any tendency of one tumbler object to frictionally engage another and thus inhibit free tumbling is eliminated.

The division of object cell 6 into multiple compartments, in addition to allowing freer tumbling of the respective tumbler objects located therein, also permits the selective emphasis of one or more of the objects and provides a mechanism whereby total color subtraction may be avoided. This is accomplished by illuminating the object nearest the viewer to some extent by unmodified (i.e. white) light. To this end, individual compartments 11 and 12 are provided with interior white walls 49 and 50 that scatter light enters through diffuse member 18.

A further aspect of the invention is illustrated in FIG. 20 which shows a perspective view of a single compartment object cell 150 containing tumbler objects 152 and 155 of any of the types described above. Also contained within object cell 150 is a plurality of small transparent beads 57 which are free to tumble as the object cellis rotated. In use, at least some of beads 157 tend to locate themselves between tumbler objects 152 and 155 so as to provide separation therebetween. While FIG. 20 shows a single compartment cell, it should be recognized that tumbler objects 152 and 155 and beads 157 may be located in separate compartments within a multiple compartment object cell.

The provision of beads 157 results in an increased dynamic effect. At least some of the beads are preferably clear, but some colored beads, especially of a primary color in a subdued tone, may be included. The beads themselves do not generally permit the viewer to discern pictorial information behind them. However, the bead outlines may be seen through the tumbler objects and the beads pick up the colors of the object through which they are viewed. In this way, the beads appear as different colors at different times, and occasionally a change of apparent color of a given bead or group of beads may be observed as the bead moves across a boundary between regions of different color. Additionally, the beads tend to have a focusing effect, thereby producing localized small regions of relatively intense light which add dramatic accents to the overall pattern.

In summary it can be seen that the present invention provies an optical image multiplying device that produces colorful, complex and highly variable patterns with the surprising benefit of periodic recognizability of individual pictorial images. While the above represents a full and complete disclosure of the present invention, alternate embodiments, equivalents, and the like will be apparent. For example, the embodiment described is a direct viewing device, but the same principles could equally well be applied to a projection device. Therefore, the foregoing description should not be construed as limiting the scope of the present invention which is defined by the appended claims.

We claim:

1. In an optical image multiplying device having a housing, parts of which housing define an aperture, reflecting planes contained within said housing, and an object cell mounted to said housing remote from said aperture wherein light passing between said object cell and said aperture passes between said reflecting planes to produce multiplied images, the improvement comprising:

first and second tumbler objects within said object cell, said objects being capable of rotating and tumbling relative to one another, wherein each object carries a pictorial representation on a first region thereof, wherein said pictorial representation on said first region of said first object includes a light transmitting portion through which details of said pictorial representation of said second object can been seen when viewed through said light transmitting portion, and wherein said first object includes a second light transmitting colored region distinct from said first region.

2. The invention of claim 1 wherein said first object includes a third colorless light transmitting region distinct from said first and second regions.

3. The invention of claim 2 wherein said third colorless light transmitting region extends to an edge of said first object.

4. The invention of claim 3 wherein said first regions of said first and second objects are on geometrically different selected areas of said first and second objects such that said first and second pictorial representations intermittently overlap and separate as said objects freely rotate and tumble in said object cell, with at least one of said pictorial representations being rendered generally recognizable when said pictorial representations separate.

5. The invention of claim 1 wherein said object cell comprises first and second individual compartments, containin said first and second tumbler objects, respectively, such that said tumbler objects in said compartments may tumble and rotate independently of and without frictional interference from one another.

6. The invention of claim 5 wherein said object cell includes means for illuminating said first object in said first compartment with light that is substantially unmoified by said second object in said second compartment.

7. The invention of claim 6 wherein said means for illuminating comprises a white wall surrounding said object cell such that light entering said object cell scatters and illuminates said first object.

8. The invention of claim 1 also comprising a third tumbler object substantially devoid of pictorial content and having a clear region and a transparent colored region for modifying and interacting with said second region on said first tumbler object.

9. The invention of claim 1 also comprising a plurality of generally transparent beads within said object cell.

10. The invention of claim 9 wherein at least some of said beads are clear.

11. The invention of claim 1 wherein said light passes through said object cell in a direction toward said aperture and wherein said device is a direct viewing device.

* * * * *